United States Patent
Chou et al.

(10) Patent No.: US 7,817,414 B2
(45) Date of Patent: Oct. 19, 2010

(54) ELECTRONIC DEVICE BEARING SEAT

(75) Inventors: Wei-Huan Chou, Taipei (TW); Kai-Chen Tien, Taipei (TW); Fang-Yu Hsieh, Taipei (TW); Ya-Wen Deng, Taipei (TW); Sih-Ren Fu, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 184 days.

(21) Appl. No.: 12/057,312

(22) Filed: Mar. 27, 2008

(65) Prior Publication Data
US 2008/0239658 A1      Oct. 2, 2008

(30) Foreign Application Priority Data
Mar. 30, 2007   (TW) ............................. 96111296 A

(51) Int. Cl.
*G06F 1/16* (2006.01)
(52) U.S. Cl. ............................. 361/679.41; 361/679.56; 361/679.58; 710/303; 710/304
(58) Field of Classification Search ............. 361/679.43
See application file for complete search history.

(56) References Cited
U.S. PATENT DOCUMENTS

| | | | |
|---|---|---|---|
| 5,933,321 A | 8/1999 | Ruch et al. | |
| 5,959,835 A * | 9/1999 | Dohi et al. | 361/679.41 |
| 6,049,813 A | 4/2000 | Danielson et al. | |
| 6,216,195 B1 | 4/2001 | Lee et al. | |
| 6,741,462 B2 * | 5/2004 | Kamphuis et al. | 361/679.02 |
| 7,061,757 B2 * | 6/2006 | Kuo et al. | 361/679.45 |
| 7,139,168 B2 * | 11/2006 | DeLuga et al. | 361/679.58 |
| 7,379,295 B2 * | 5/2008 | Ke | 361/679.41 |
| 2004/0145864 A1 * | 7/2004 | Usui et al. | 361/683 |
| 2008/0316700 A1 * | 12/2008 | Ke | 361/686 |

\* cited by examiner

*Primary Examiner*—Jayprakash N Gandhi
*Assistant Examiner*—Anthony Q Edwards

(57) ABSTRACT

An electronic device bearing seat includes a casing, a hook, a first resilient element, an ejector, a second resilient element, a pivot, a connecting rod and an ejecting button. The casing has a first opening and a second opening. The hook is movably provided in the first opening and includes a first withstanding post and a recess. The first resilient element is disposed between the casing and the hook. The ejector is movably provided in the second opening and is detachably fastened in the recess. The ejector includes a second withstanding post. The second resilient element is disposed between the casing and the ejector. The shaft is disposed in the casing. The connecting rod is rotatably disposed at and passed by the pivot and pushes against the first and second withstanding post. The ejecting button is movably disposed on the casing and abuts against the connecting rod.

14 Claims, 5 Drawing Sheets

ELECTRONIC DEVICE BEARING SEAT

BACKGROUND OF THE INVENTION

1. Field of the Invention

The invention relates to an electronic device bearing seat and, more particularly, to a docking for bearing a tablet computer.

2. Description of the Related Art

Generally speaking, as for a tablet computer, it may be used at an electronic device bearing seat (such as a docking). Furthermore, the docking is not only a stable placing and operating platform, and it also has various wirings arranged therein. The wirings are connected to various peripheral devices, respectively. Therefore, after the tablet computer is combined with the docking, the tablet computer may be electrically connected to various peripheral devices via the docking. In detail, a connector may be provided at the docking and connected to the various wirings (or peripheral devices) at the same time. The tablet computer also has a connector. After the tablet computer is combined with the docking, the connector of the tablet computer is combined with the connector of the docking. Thus, the tablet computer is electrically connected to various peripheral devices.

However, as for the conventional structural design of the docking, a protrudent hook is usually used to fasten the tablet computer. That is, in the process of placing the tablet computer to the docking, the protrudent hook retracts into the docking because of the movement and pressure of the casing surface of the tablet computer. After the tablet computer is completely placed to or in the docking (that is, after the connector of the tablet computer is connected to the connector of the docking), the hook is protrudent from the docking under the resilience again and fastened into a corresponding fastening hole on the casing surface of the tablet computer. Thus, the tablet computer is fastened with the docking.

As stated above, in the process of placing the tablet computer to the docking, since the casing surface of the tablet computer moves and presses the hook of the docking, the casing surface of the tablet computer often is abraded. Therefore, the sense of beauty of the appearance is destroyed. In addition, the conventional docking also has a complicated structure and disadvantages such as loving effectiveness easily.

Therefore, one objective of the invention is to provide an electronic device bearing seat (docking), which avoids abrading the casing surface of the tablet computer in the combining process.

BRIEF SUMMARY OF THE INVENTION

In the invention, the characteristics described in detail hereinbelow are used to solve the above problem. That is, an electronic device bearing seat of the invention is applied to bear an electronic device. The electronic device bearing seat includes a casing, a hook, a first resilient element, an ejector, a second resilient element, a pivot, a connecting rod and an ejecting button. The casing has a first opening and a second opening. The hook is movably provided in the first opening and is fastened to the electronic device detachably. The hook has a first withstanding post and a recess. The first resilient element is disposed between the casing and the hook and is used for providing resilience for the hook. The ejector is movably provided in the second opening and is detachably fastened to the recess of the hook to eject the electronic device. The ejector has a second withstanding post. The second resilient element is disposed between the casing and the ejector and is used for providing resilience for the ejector. The pivot is disposed in the casing. The connecting rod is rotatably provided at the pivot and passed by the pivot, and it pushes the first withstanding post and the second withstanding post to drive the hook and the ejector to move. The ejecting button is movably disposed on the casing, and it abuts against the connecting rod to drive the connecting rod to rotate around the pivot.

The electronic device bearing seat of the invention further includes a torsion spring connected between the pivot and the connecting rod and used for providing resilience for the connecting rod.

In the invention, the first withstanding post is corresponding to the first opening.

In the invention, the second withstanding post is corresponding to the second opening.

In the invention, the moving direction of the hook is perpendicular to the moving direction of the ejector.

In the invention, the ejector is roughly L-shaped.

These and other features, aspects, and advantages of the present invention will become better understood with regard to the following description, appended claims, and accompanying drawings.

DETAILED DESCRIPTION OF THE EMBODIMENTS

The preferred embodiment of the invention is described with appended drawings.

Figure 1:
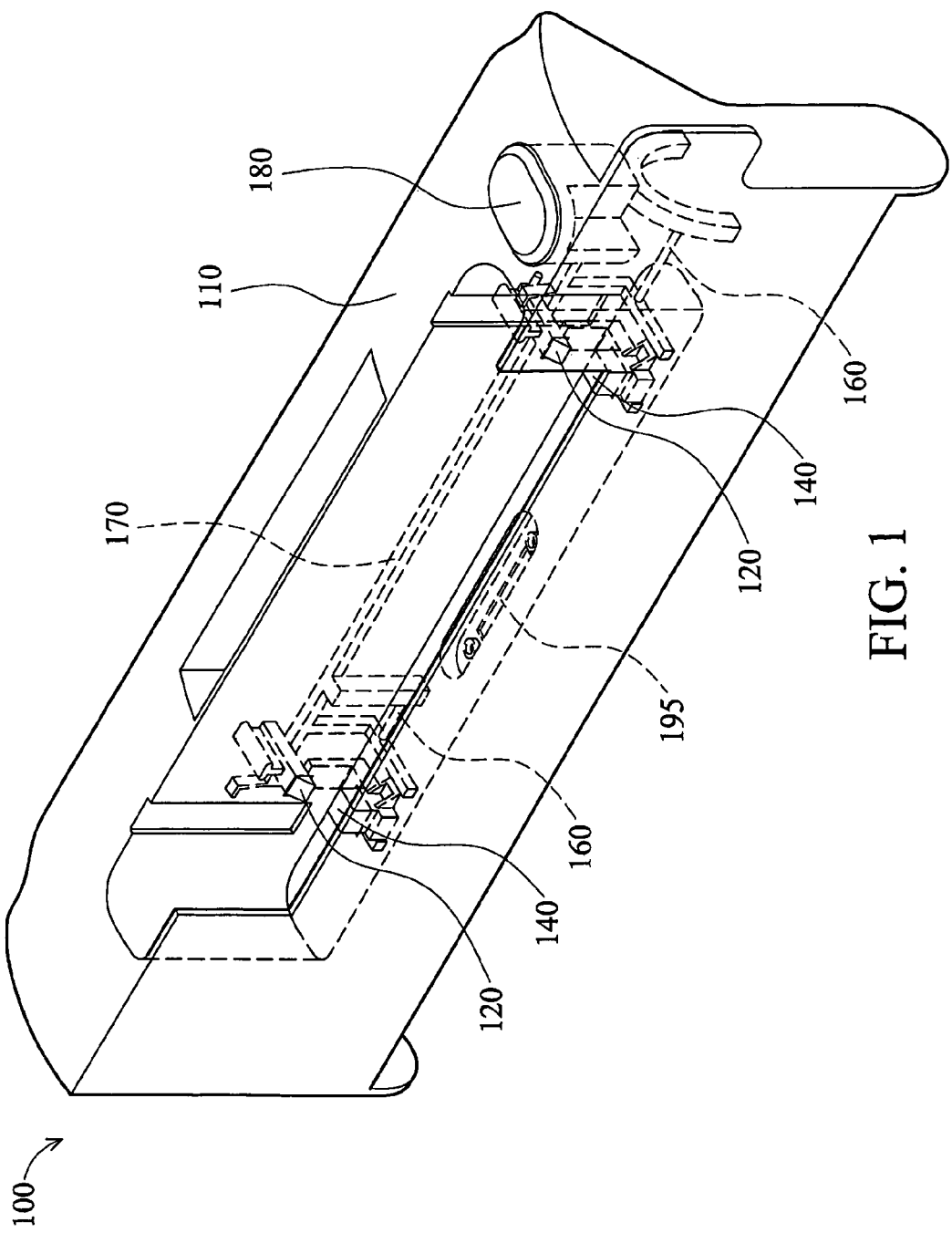
FIG. 1 is a three-dimensional schematic diagram showing an electronic device bearing seat according to one embodiment of the invention.
Figure 2:
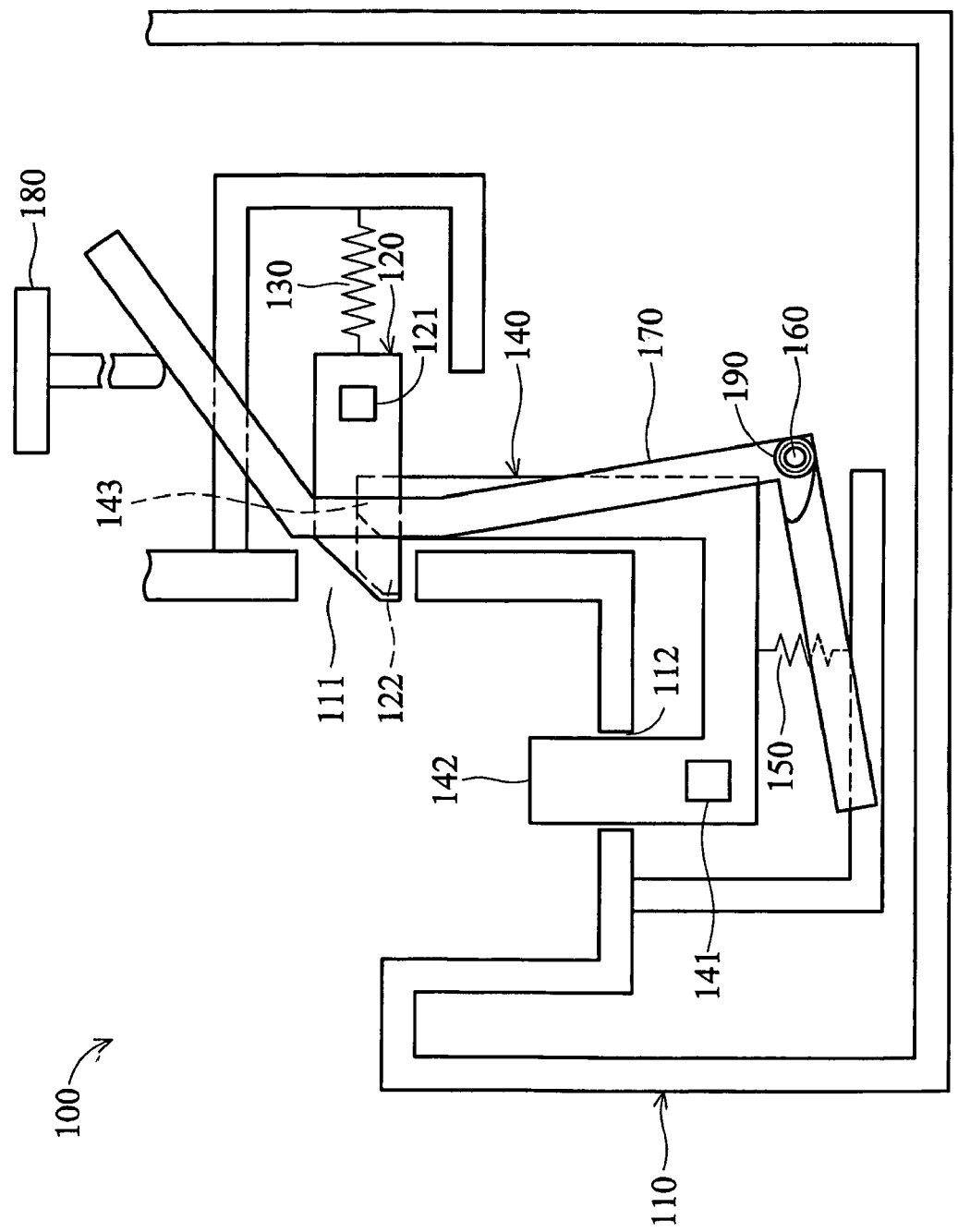
FIG. 2 is a schematic diagram showing a part of lateral view and inner structure of the electronic device bearing seat according to one embodiment of the invention in a working state.

As shown in FIG. 1 and FIG. 2, the electronic device bearing seat (docking) 100 of the embodiment is applied to bear an electronic device (such as a tablet computer or a notebook which is not shown in FIG. 1 and FIG. 2). The electronic device bearing seat 100 mainly includes a casing 110, two hooks 120, two first resilient elements 130, two ejectors 140, two second resilient elements 150, two pivots 160, a connecting rod 170, an ejecting button 180, two torsion springs 190 and a connector 195.

As shown in FIG. 2, the casing 110 has a first opening 111 and a second opening 112.

Each hook 120 is movably provided in each first opening 111 of the casing 110, and each hook 120 has a first withstanding post 121 and a recess 122. The first withstanding post 121 is corresponding to the first opening 111 of the casing 110 and is protrudently disposed at the hook 120.

Each first resilient element 130 is disposed between the casing 110 and each hook 120 and is used for providing resilience for each hook 120. In addition, in the embodiment, the first resilient element 130 may be a spring.

Each ejector 140 is U-shaped and movably provided in each second opening 112 of the casing 110. One end of each ejector 140 is detachably fastened to the recess 122 of each hook 120. In detail, as shown in FIG. 2, one side of the U-shaped ejector 140 is shorter. The shorter side is a ejecting end 142 and is movably provided in the second opening 112, and the other side is a fastening end 143 and is detachably fastened in the recess 122. In addition, each ejector 140 has a second withstanding post 141 which is corresponding to the second opening 112 of the casing 110 and is protrudently disposed at the ejector 140. In addition, in the embodiment, the moving direction of the hook 120 is perpendicular to the moving direction of the ejector 140.

Each second resilient element 150 is disposed between the casing 110 and each ejector 140 and is used for providing resilience for each ejector 140. In addition, in the embodiment, the second resilient element 150 also may be a spring.

Each pivot 160 is disposed (fixed) in the casing 110.

The connecting rod 170 is rotatably disposed at and passed by two pivots 160, and it can push the first withstanding post 121 of each hook 120 and the second withstanding post 141 of each ejector 140. The connecting rod 170 can be used for driving the hooks 120 and the ejectors 140 to move (the working manner is described hereinbelow.)

The ejecting button 180 is movably disposed on the casing 110, and it abuts against the connecting rod 170. The ejecting button 180 can be used to drive the connecting rod 170 to rotate around two pivots 160.

Each torsion spring 190 is connected between each pivot 160 and the connecting rod 170 and is used for providing resilience for the connecting rod 170. In detail, the torsion spring 190 may be disposed at and passed by the pivot 160, and the two ends of the torsion spring 190 is fixedly connected to pivot 160 and the connecting rod 170, respectively.

The connector 195 is protrudent on the casing 110, and it may be provided between the two ejectors 140 (or two hooks 120), as shown in FIG. 1. The connector 195 may be connected to various wirings (not shown) at the same time, and the wirings may be connected to various peripheral devices (not shown).

The working manner of the electronic device bearing seat (docking) 100 and an electronic device is described hereinbelow.

First, as shown in FIG. 2, when the electronic device bearing seat (docking) 100 does not bear any electronic device, the ejector 140 is protrudent from the second opening 112 of the casing 110 and fastened in the recess 122 of the hook 120 under the resilience provided by the second resilient element 150. That is, the ejecting end 142 is protrudent from the second opening 112 of the casing 110, and the fastening end 143 is fastened in the recess 122 of the hook 120. At that moment, the first resilient element 130 between the casing 110 and the hook 120 is compressed.

Figure 3:
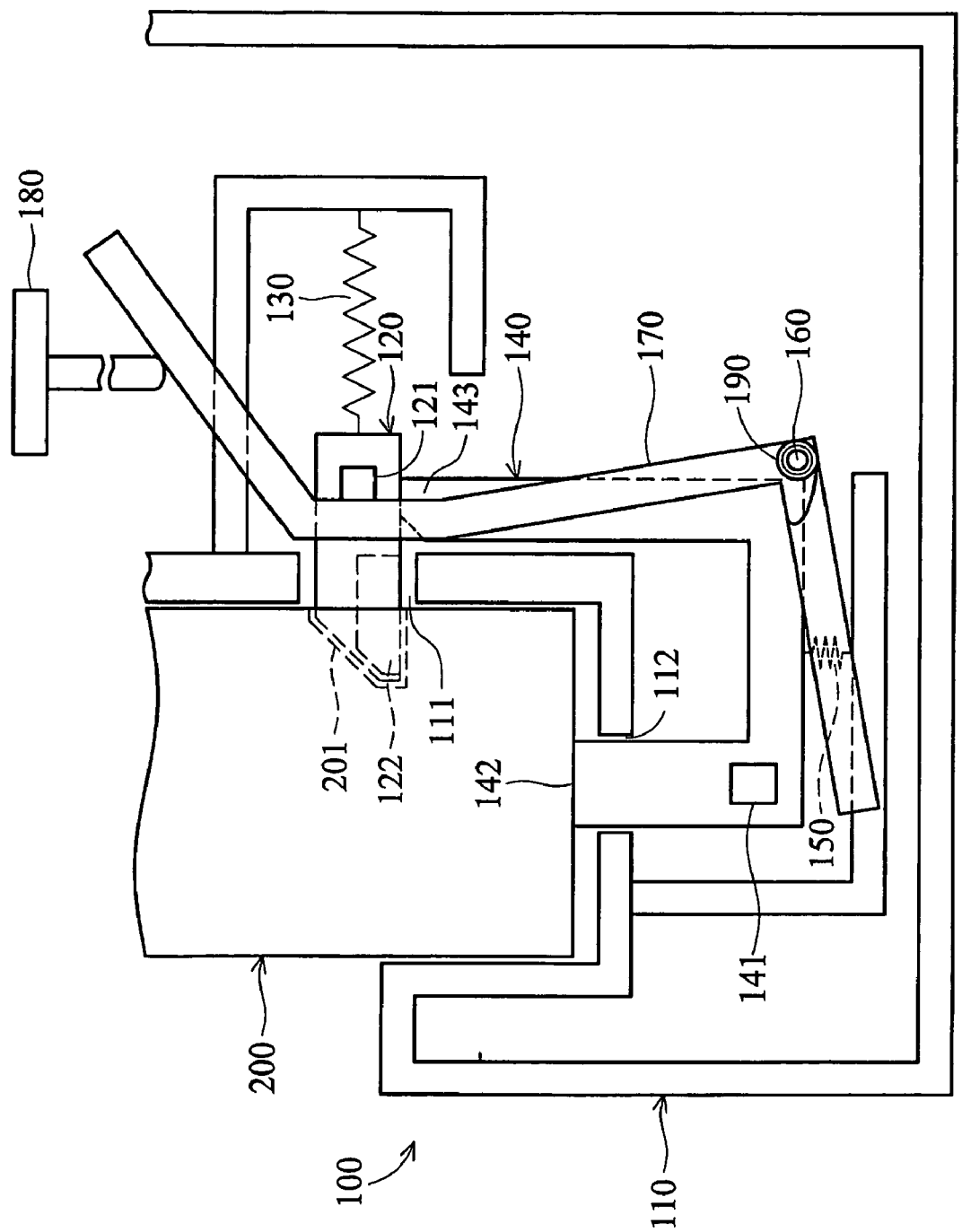
FIG. 3 is a schematic diagram showing a part of lateral view and inner structure of the electronic device bearing seat according to one embodiment of the invention in another working state.

As shown in FIG. 3, when an electronic device (tablet computer) 200 is put into the electronic device bearing seat (docking) 100 from the top of the casing 110, the ejector 140 moves downward under the pressure of the electronic device 200. Then, the fastening end 143 of the ejector 140 moves downward, and it is gradually separated from the recess 122 of the hook 120. When the ejector 140 moves downward to allow the fastening end 143 to be completely separated from the recess 122 of the hook 120, the hook 120 moves immediately and is protrudent from the first opening 111 of the casing 110 under the resilience provided by the first resilient element 130. Thus, the hook 120 is fastened to a fastening hole 201 of the electronic device 20. At the same time, the first withstanding post 121 of the hook 120 is against the connecting rod 170. Thus, the electronic device 200 can be born by the electronic device bearing seat (docking) 100 steadily, and a connector (not shown) of the electronic device 200 is connected to the connector 195 of the electronic device bearing seat (docking) 100. Therefore, the electronic device 200 is connected to a plurality of peripheral devices.

Figure 4:
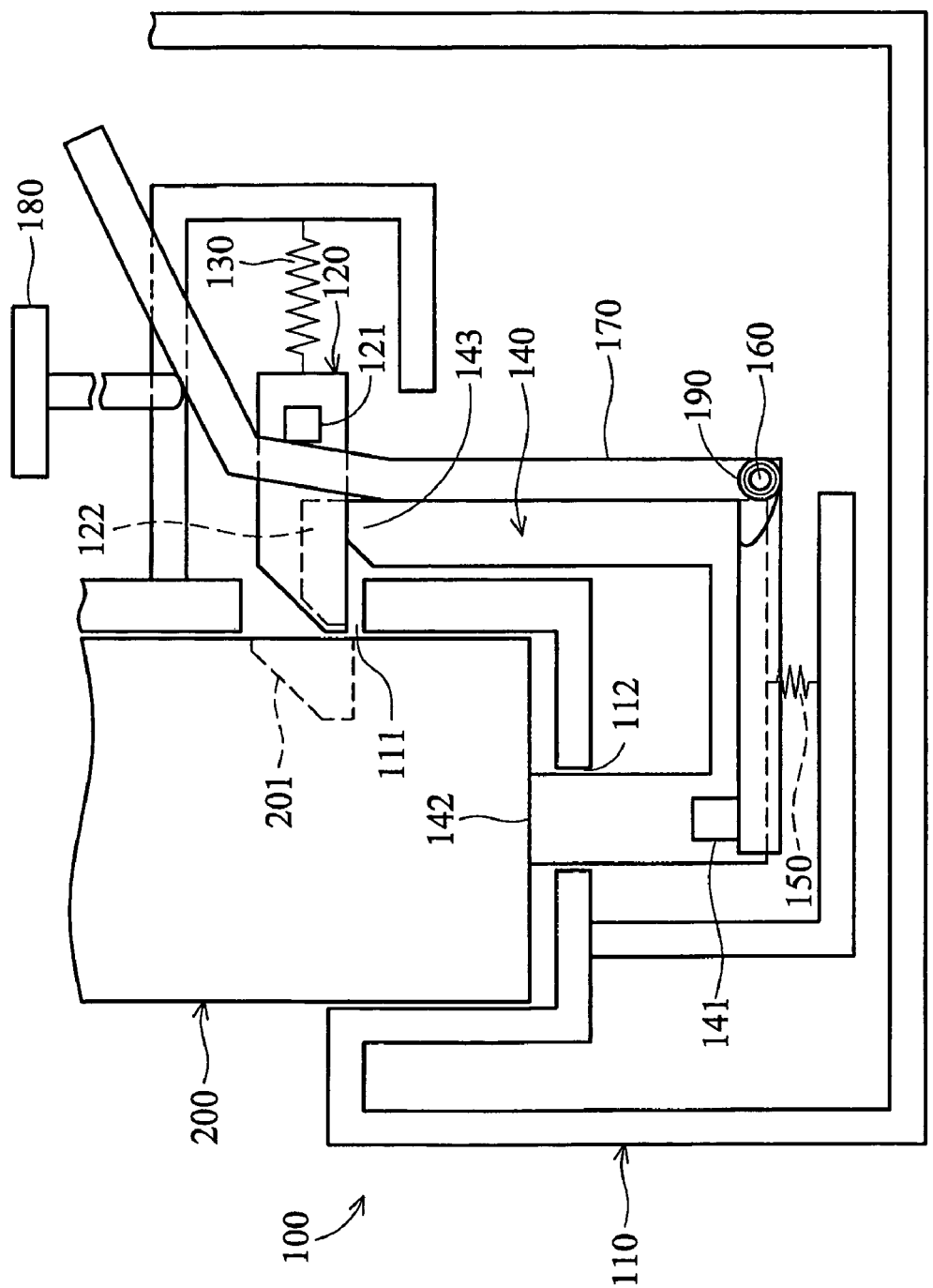
FIG. 4 is a schematic diagram showing a part of lateral view and inner structure of the electronic device bearing seat according to one embodiment of the invention in another working state.
Figure 5:
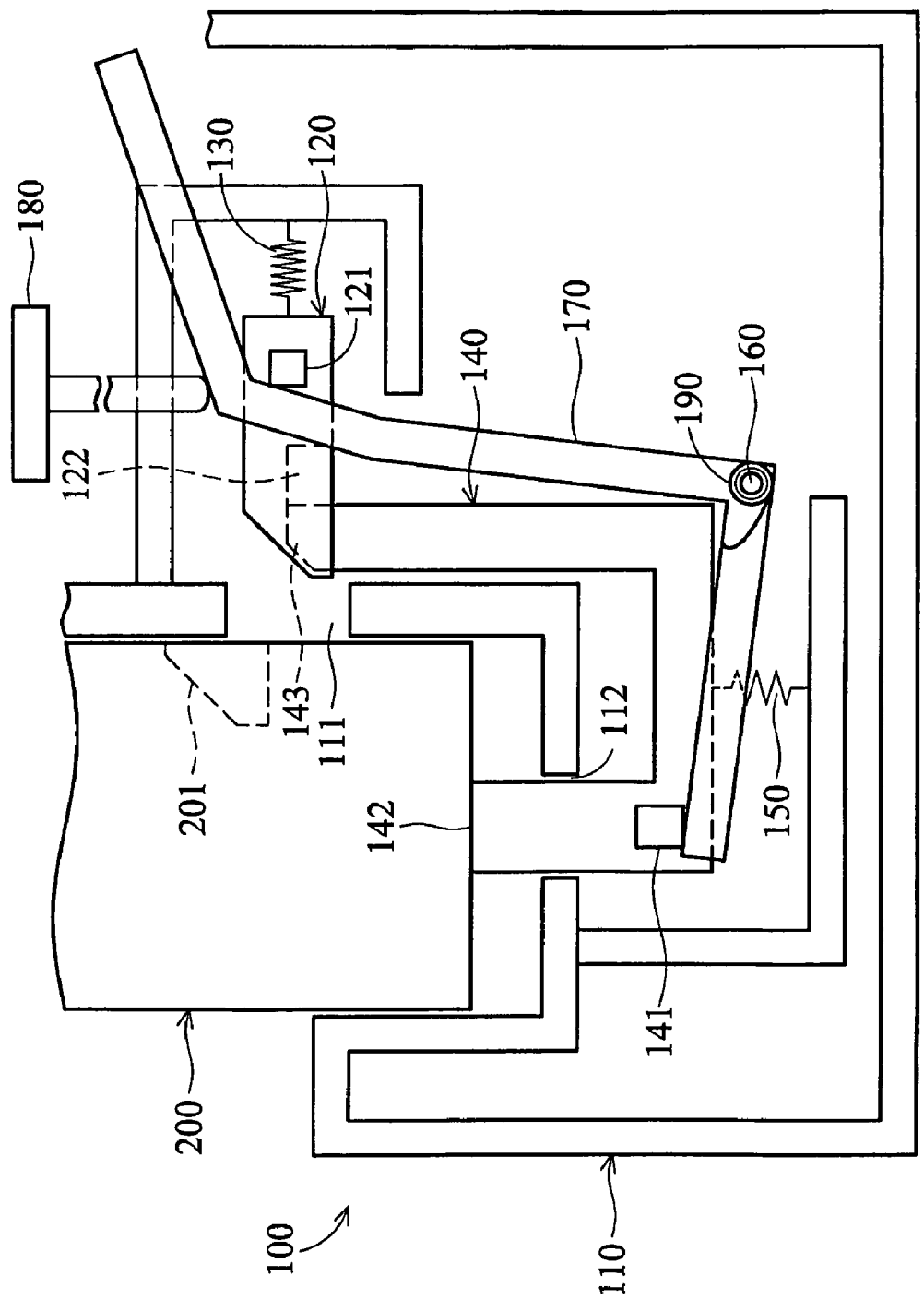
FIG. 5 is a schematic diagram showing a part of lateral view and inner structure of the electronic device bearing seat according to one embodiment of the invention in another working state.

When the electronic device 200 needs to be separated from the electronic device bearing seat (docking) 100, a user can directly press the ejecting button 180. At that moment, the ejecting button 180 moving downward forces the connecting rod 170 to rotate around the pivot 160 (along the clockwise direction). At that moment, the rotating connecting rod 170 presses (rightward) the first withstanding post 121 of the hook 120, and the hook 120 is driven to move (rightward) into the casing 110. Then, the rotating connecting rod 170 continues pushing (rightward) the first withstanding post 121 of the hook 120, and then the recess 122 of the hook 120 is above the fastening end 143 of the ejector 140, as shown in FIG. 4. At that moment, the connecting rod 170 abuts against the second withstanding post 141 of the ejector 140. Then, the user still continues pressing the ejecting button 180 to allow the rotating connecting rod 170 to continue pushing the first withstanding post 121 of the hook 120 (rightward) and the second withstanding post 141 of the ejector 140 upward simultaneously. The ejecting end 142 of the ejector 140 moves upward at the second opening 112 of the casing 110 to eject the electronic device, as shown in FIG. 5. Thus, the connector of the electronic device 200 is separated from the connector 195 of the electronic device bearing seat (docking) 100. Finally, after the electronic device 200 is completely moved out of the electronic device bearing seat (docking) 100, the user may directly release the ejecting button 180. The connecting rod 170 rotates (along the clockwise direction) to its original position under the resilience provided by the torsion spring 190. The hook 120 moves (leftward) under the resilience provided by the first resilient element 130 to be fastened with the fastening end 143 of the ejector 140 again, as shown in FIG. 1.

As stated above, the electronic device bearing seat (docking) disclosed in the invention has many advantages. First, in the process of placing the electronic device 200 in the electronic device bearing seat (docking) 100, since the casing surface of the electronic device 200 does not move and press the hook 120 of the electronic device bearing seat (docking) 100, the casing surface of the electronic device 200 is not abraded, and the sense of beauty of the appearance is not destroyed. The electronic device bearing base (docking) 100 is easy to be operated, and a user is allowed to place the electronic device 200 in the electronic device bearing seat (docking) 100 easily and separate the electronic device 200 from the electronic device bearing seat (docking) 100 easily. The structure of the electronic device bearing seat (docking) 100 is simplified to avoid losing effectiveness in working and decease the manufacturing cost.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. An electronic device bearing seat suitable to bear an electronic device, the electronic device bearing seat comprising:
    a casing having a first opening and a second opening;
    a hook movably provided in the first opening and having a first withstanding post and a recess, wherein the hook is detachably fastened to the electronic device;
    a first resilient element disposed between the casing and the hook and used for providing resilience for the hook;
    an ejector movably provided in the second opening and detachably fastened in the recess of the hook to eject the electronic device, wherein the ejector has a second withstanding post;
    a second resilient element disposed between the casing and the ejector and used for providing resilience for the ejector;
    a pivot disposed in the casing;
    a connecting rod rotatably disposed at the pivot, passed by the pivot and used for pushing the first withstanding post and the second withstanding post to drive the hook and the ejector to move; and
    an ejecting button movably disposed on the casing and abutting against the connecting rod to drive the connecting rod to rotate around the pivot.

2. The electronic device bearing seat according to claim 1 further comprising a torsion spring connected between the pivot and the connecting rod and used for providing resilience for the connecting rod.

3. The electronic device bearing seat according to claim 1, wherein the first withstanding post is corresponding to the first opening.

4. The electronic device bearing seat according to claim 1, wherein the second withstanding post is corresponding to the second opening.

5. The electronic device bearing seat according to claim 1, wherein the moving direction of the hook is perpendicular to the moving direction of the ejector.

6. The electronic device bearing seat according to claim 1, wherein the ejector is about U-shaped, and one side of the ejector is shorter.

7. An electronic device bearing seat suitable to bear an electronic device, the electronic device bearing seat comprising:
    a casing having a first opening and a second opening;
    a hook movably provided in the first opening and having a first withstanding post and a recess, wherein the first withstanding post is protrudently provided at the hook;
    an ejector which is U-shaped, wherein one end of the ejector is an ejecting end movably provided in the second opening, the other end of the ejector is a fastening end detachably fastened in the recess of the hook, and the ejector has a second withstanding post protrudently disposed at the ejector;
    a pivot disposed in the casing;
    a connecting rod rotatably disposed at the pivot, passed by the pivot and used for pushing the first withstanding post and the second withstanding post to drive the hook and the ejector to move; and
    an ejecting button movably disposed on the casing and abutting against the connecting rod to drive the connecting rod to rotate around the pivot.

8. The electronic device bearing seat according to claim 7 further comprising a first resilient element disposed between the casing and the hook to provide resilience for the hook.

9. The electronic device bearing seat according to claim 7 further comprising a second resilient element disposed between the casing and the ejector to provide resilience for the ejector.

10. The electronic device bearing seat according to claim 7 further comprising a torsion spring connected between the pivot and the connecting rod to provide resilience for the connecting rod.

11. The electronic device bearing seat according to claim 7, wherein the first withstanding post is corresponding to the first opening.

12. The electronic device bearing seat according to claim 7, the second withstanding post is corresponding to the second opening.

13. The electronic device bearing seat according to claim 7, wherein the moving direction of the hook is perpendicular to the moving direction of the ejector.

14. The electronic device bearing seat according to claim 7, wherein the ejector is about U-shaped, and one side of the ejector is shorter.

* * * * *